United States Patent
Wandel

(10) Patent No.: US 8,401,754 B2
(45) Date of Patent: Mar. 19, 2013

(54) METHOD FOR DETECTING THE STATUS OF THE CLUTCH IN THE DRIVE TRAIN OF A MOTOR VEHICLE

(75) Inventor: Helmut Wandel, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 493 days.

(21) Appl. No.: 12/304,706

(22) PCT Filed: Nov. 15, 2007

(86) PCT No.: PCT/EP2007/062359
§ 371 (c)(1),
(2), (4) Date: May 20, 2009

(87) PCT Pub. No.: WO2008/061927
PCT Pub. Date: May 29, 2008

(65) Prior Publication Data
US 2009/0306869 A1 Dec. 10, 2009

(30) Foreign Application Priority Data
Nov. 21, 2006 (DE) .......................... 10 2006 054 702

(51) Int. Cl.
*G06F 17/00* (2006.01)
(52) U.S. Cl. ................................ 701/67; 701/61; 477/77
(58) Field of Classification Search .................. 701/29.4, 701/29.7, 61, 67; 477/77, 78
See application file for complete search history.

(56) References Cited

U.S. PATENT DOCUMENTS

| 6,167,996 B1 * | 1/2001 | Huber et al. ............... 192/30 W |
| 2003/0136596 A1 * | 7/2003 | Iriyama .......................... 180/170 |
| 2003/0220171 A1 | 11/2003 | Sauter | |

FOREIGN PATENT DOCUMENTS

| DE | 102 38 464 | 10/2003 |
| DE | 10 2004 012 158 | 9/2005 |
| EP | 0 922 604 | 6/1999 |
| EP | 922604 A2 * | 6/1999 |
| EP | 1 332 909 | 8/2003 |
| EP | 1332909 A2 * | 8/2003 |
| FR | 2 881 491 | 8/2006 |
| JP | 2003-293813 | 10/2003 |
| WO | WO 2006/079764 | 8/2006 |
| WO | WO 2006079764 A1 * | 8/2006 |

OTHER PUBLICATIONS

International Search Report, PCT/EP2007/062359 dated Mar. 5, 2008.

* cited by examiner

*Primary Examiner* — Gerald McClain
(74) *Attorney, Agent, or Firm* — Kenyon & Kenyon LLP

(57) ABSTRACT

In a method for detecting the status of the clutch in the drive train of a motor vehicle, the engine speed and the speed are ascertained and a transmission ratio is formed as the quotient of the engine speed and speed. Furthermore, a reference value is determined, which is set equal to the transmission ratio from a first time step. In a subsequent time step, the difference between the instantaneous transmission ratio and the reference value is formed, a disengaged clutch status being detected if the difference exceeds a threshold value.

14 Claims, 1 Drawing Sheet

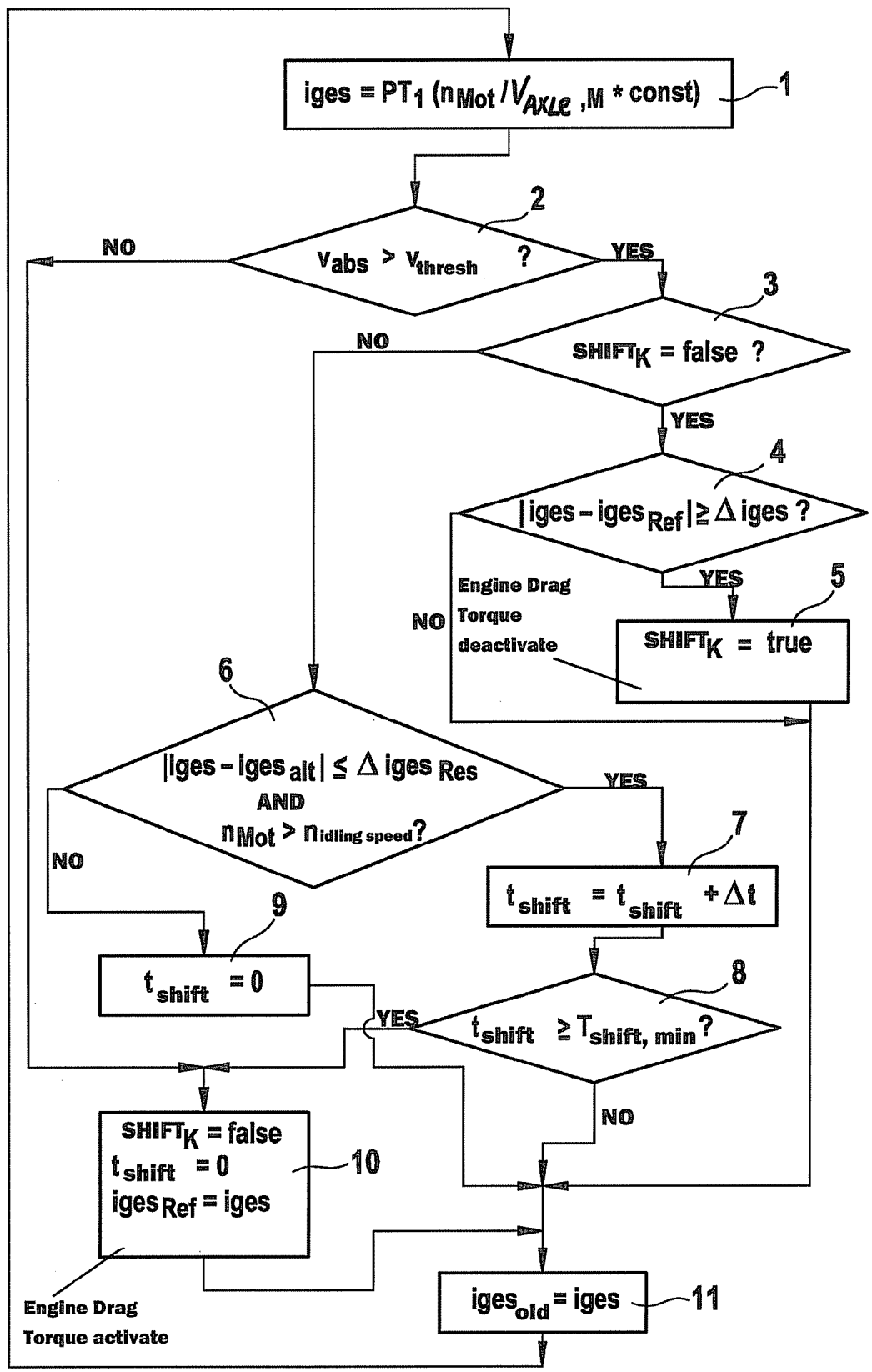

METHOD FOR DETECTING THE STATUS OF THE CLUTCH IN THE DRIVE TRAIN OF A MOTOR VEHICLE

FIELD OF THE INVENTION

The present invention relates to a method for detecting the status of the clutch in the drive train of a motor vehicle.

BACKGROUND INFORMATION

DE 102 38 464 describes a method for detecting the status of the clutch during an engine drag torque control. Since, when the transmission is shifted back from a higher gear to a lower gear or when the accelerator is suddenly released on a smooth roadway, the driving wheels of a vehicle may build up a slip, an additional engine torque is generated in the engine drag torque control, which counteracts the slip buildup on the driving wheel. However, during the engine torque increase produced by the engine drag torque control, it must be ensured that the clutch in the drive train is engaged, since in the unengaged status the engine torque increase would only result in a roar of the engine, which is not under load at this time, so that torque transfer to the driving wheel would not be possible.

To detect the status of the clutch, DE 102 38 464 provides that the engine speed and a wheel speed be ascertained and a transmission ratio be calculated therefrom. The status of the clutch may be detected from a comparison between the transmission ratio and a stored threshold value. This threshold value is a fixedly predefined threshold value which must be stored in a control unit individually for each vehicle.

SUMMARY

Example embodiments of the present invention provide a method which is implementable using simple measures and is variably usable for detecting the status of the clutch in the drive train of a motor vehicle.

In the method according to example embodiments of the present invention for detecting the status of the clutch in the drive train of a motor vehicle, a transmission ratio of the engine speed and a speed, in particular of a quotient of the engine speed and the vehicle speed, is formed from the speed of the driving engine and a speed, in particular an axle speed or a drive shaft speed, or vehicle speed, and is used as a basis of a comparison with a reference value. The status of the clutch is determined from the ratio between the instantaneous transmission ratio and the reference value. According to example embodiments of the present invention it is provided that the reference value is made equal to the transmission ratio from a first time step and subsequently in a subsequent time step the difference between the instantaneous transmission ratio and the reference value is formed. If this difference exceeds a threshold value, the clutch is in the disengaged status; otherwise it is in an engaged status.

The advantage of this procedure is in the variable determination of the reference value for the transmission ratio formed from the engine speed and speed. The reference value is filled in an initialization step, specifically using the value of the transmission ratio from a first time step. If the value of the instantaneous transmission ratio changes in one of the subsequent time steps and the difference with respect to the reference value exceeds a predefined threshold value, it may be assumed that the drive train is in a disengaged clutch status. Appropriate further measures may then be taken to take the disengaged clutch status into account. These measures concern, in particular, engine drag torque control.

In contrast with conventional methods, the reference value is no longer stored in the control unit in advance as a fixed value, but is ascertained during the running method from the instantaneous values. This makes it possible to use the method in a flexible manner on different vehicles and vehicle types, since fixedly predefined reference values, which previously had to be ascertained for different gear settings of the vehicle, are no longer required. The reference value is now determined from the algorithm in the running process.

According to an example embodiment, detection of the clutch status is used for engine drag torque control, but, in addition, other applications are also conceivable, in particular for other driver assistance systems such as traction control systems TCS, electronic stability systems ESP, antilock systems ABS, or other systems. In the case of engine drag torque control, this is deactivated when the disengaged status is detected to rule out an increase in the engine torque during the shifting process. As soon as an engaged status exists, the engine drag torque control is advantageously reactivated to generate an additional engine torque to increase the driving stability of the vehicle, which is to be supplied to a slipping driving wheel.

The reference value is advantageously continuously updated in a recursive algorithm. The reference value is made equal to the transmission ratio if an engaged clutch status is detected again following a disengaged clutch status. In this case, a gear shift is to be assumed, the gear recently shifted into being assigned a new reference value which corresponds to the transmission ratio calculated for these gears the first time. If subsequently the transmission ratio departs from this new reference value by more than an additional measure, a disengaged clutch status is to be assumed, whereupon the corresponding measures are applied again, in particular the engine drag torque control is deactivated again. In this manner, a recursive algorithm is obtained, which takes into account the currently set gear in that each gear is assigned a reference value ascertained from the instantaneous transmission ratio after shifting into this gear.

While the disengaged status is detected via a comparison between the instantaneous transmission ratio and the assigned reference value, disengagement being established if the difference exceeds a threshold value, an engaged status advantageously exists in the case where the difference between the instantaneous transmission ratio and the transmission ratio from the immediately previous time step is less than a threshold value. In the engaged status, i.e., in the event of a continuous force flow between the driving engine and the driving wheels, the difference between the transmission ratios in two consecutive time steps is either equal or approximately equal to zero, but at least less than the relatively small threshold value, since in the event of continuous force flow almost no change in the transmission ratio is to be expected between the consecutive time steps. This criterion may therefore be used for determining an engaged status. Since two consecutive transmission ratios are compared to each other and the transmission ratio is determined by computation, no vehicle-specific specification of reference value is required, just like in detecting the disengaged status; therefore, the method may be adapted to the particular vehicle with little effort. Only the threshold value must be specified for the difference of the transmission ratios in two consecutive time steps.

In an example embodiment, the absolute value of the difference between two transmission ratios is considered both for detecting the disengaged status and for detecting the engaged status. This has the advantage that the direction of change in the transmission ratio is ignored; therefore, changes in the event of an increasing transmission ratio, which corresponds to a higher engine speed or a lower engine speed, are detected in the same way as decreasing transmission ratios, which correspond to a decreasing engine speed or an increasing speed.

The detection of the engaged status may also be linked to other conditions in addition to considering the difference between the transmission ratios in two consecutive time steps. It is thus advantageous, for example, to determine an engaged status only if the difference in question remains below the corresponding threshold value for a minimum time period. In addition, the engine speed should preferably be greater than a minimum speed, which is the idling speed in particular; this ensures that the engine drag torque control may take place only when the engine runs at a higher rotational speed.

According to an example, the signal of the transmission ratio which is formed by dividing the engine speed by the speed is filtered using a first-order delay element ($PT_1$ element). Due to this filtering, the signal in the engaged status is relatively constant and provides the actual transmission ratio even in the event of interference or wheel vibrations which may occur, for example, in the event of an ABS braking.

The average driving speed is preferably used as the speed value which serves as a basis for ascertaining the transmission ratio. Basically, however, other longitudinal speed values may also be considered, for example the speed at the center of gravity of the vehicle or in the wheel area.

The method according to example embodiments of the present invention may be used to particular advantage in a vehicle having an internal combustion engine as the driving motor. Furthermore, the method is used in particular in vehicles having a manual transmission; basically it may also be used in vehicles having an automatic transmission with shifting between different gears.

Further advantages and advantageous example embodiments are described in the description of the figures and from the drawings. The FIGURE shows a block diagram illustrating the sequence of a method for detecting the status of the clutch in the drive train of a motor vehicle.

In method step 1, the transmission ratio iges for the drive train is initially ascertained from the quotient of engine speed $n_{mot}$ and the average axle speed $v_{axle,M}$. This quotient is also multiplied by a constant const; in addition, the signal is filtered using a first-order delay element ($PT_1$ element). The $PT_1$ filtering ensures a smoothed signal curve. Transmission ratio iges is ascertained anew every time the method is run.

In next method step 2, a speed query is performed. A test is made of whether the instantaneous absolute speed $v_{abs}$ of the vehicle, referred to the vehicle's center of gravity, exceeds a predefined speed threshold value $v_{thresh}$ which may be established at a value of 5.55 m/s, for example. Disengagement detection is only activated above this speed threshold value $v_{thresh}$. Accordingly, in the event of a vehicle speed $v_{abs}$ below the threshold value, the program continues in the No branch to method step 10, in which parameters and characteristic quantities which are needed for the subsequent disengagement detection are initialized. In this way it is ensured that when the vehicle is started, the initialization values needed for disengagement detection and for the subsequent method steps are determined.

In method step 10 initially a parameter $\text{shift}_K$, which represents the status of the clutch and is designed as a logical flag, is set at the value "false." This value $\text{shift}_K$=false means, for the purposes of the method, that an engaged clutch status is assumed. In contrast, in the event of $\text{shift}_K$=true, a disengaged clutch status is assumed.

Furthermore, in block 10 a time counter $t_{shift}$ is set at the value zero. Furthermore, a reference value $\text{iges}_{Ref}$ for the transmission ratio is set at the instantaneous value iges of the transmission ratio, whereby the reference value $\text{iges}_{Ref}$ is initialized. Finally, in method step 10, the engine drag torque control is basically activated, so that engine drag torque control may be performed provided the other preconditions for performing the engine drag torque control are met.

After running through method step 10, the program continues to method step 11, in which the value of $\text{iges}_{old}$ as another parameter is made equal to the instantaneous transmission ratio iges and thus initialized. This parameter $\text{iges}_{old}$ is needed for the query according to method step 6 of whether an engaged status may again be assumed following the disengaged transmission status.

After initialization in method step 11, the program returns to the start of the method and, in method step 1, transmission ratio iges is updated. The entire method is run through cyclically with a time interval $\Delta t$ of 0.02 s.

Assuming that vehicle speed $v_{abs}$ has, in the meantime, exceeded the corresponding speed threshold value $v_{thresh}$, in method step 2, following the Yes branch, the program continues to the next query in method step 3 in which a check is made of whether the clutch status $\text{shift}_K$ has been set at the value "false." If this is the case, an engaged status is assumed, i.e., a continuous force flow in the drive train, and the program continues along the Yes branch to the next method step 4. In method step 4 a query is made of whether the conditions for engaged status are still being met. This is checked with the help of the formula $$|\text{iges}-\text{iges}_{Ref}| \leq \Delta\text{iges},$$

according to which a check is made of whether the absolute value of the difference between the instantaneous transmission ratio iges and reference value $\text{iges}_{Ref}$ of the transmission ratio is greater than or equal to a disengagement threshold value $\Delta\text{iges}$, which is advantageously fixedly predefined in the system. Using this query a check is made of whether the transmission ratio has changed so significantly that a recently performed shift with disengaged clutch in the drive train must be assumed. If this is the case, the program continues along the Yes branch to the next method step 5, in which the clutch status $\text{shift}_K$ is set at the value "true," which means that the drive train is in the disengaged status. Furthermore, in method step 5, the engine drag torque control is deactivated in order to rule out an increase in engine torque and an undesirable roar of the engine.

Subsequently, the program continues to method step 11, where parameter $\text{iges}_{old}$ is set to the instantaneous value iges of the transmission ratio after each run of the method.

If the query in method step 3 results in that parameter $\text{shift}_K$ for the clutch status has been set at the value "true," the clutch is in the disengaged status and the program continues along the No branch to method step 6 in which a query is performed of whether the disengaged status continues to exist. This is checked with the help of the query $$|\text{iges}-\text{iges}_{old}| \leq \Delta\text{iges}_{Res},$$

according to which the absolute value of the difference between instantaneous transmission ratio iges and transmission ratio $\text{iges}_{old}$ from the immediately previous time step is checked to determine whether an engagement threshold value $\Delta\text{iges}_{Res}$ for the transmission ratio has been undershot. If the engagement threshold value $\Delta\text{iges}_{Res}$ is undershot, then the transmission ratio has not changed or has changed only very little in two consecutive time steps, wherefrom the engaged status may be inferred.

However, this determination is linked to additional conditions. According to method step 6, it is additionally checked (logical AND) whether engine speed $n_{Mot}$ of the internal combustion engine is greater than the idling speed. Thereby it is ruled out that, in the disengaged and stable idling state, the shift$_K$ switch is set at "false" and thus at the value for the engaged status.

If the two conditions in method step 6 are met, the program continues along the Yes branch to method block 7, in which a time counter $t_{shift}$ is incremented by a time interval $\Delta t$ which is the clock rate using which the entire method is carried out. In next method step 8 a query is made of whether time counter $t_{shift}$ exceeds a minimum time period $T_{shift,min}$. This query ensures that clutch status shift$_K$ is reset to the value "false" only if the conditions of method step 6 are met for a certain minimum time period. If this is the case, the program follows the Yes branch and continues to method block 10, in which, among other things, shift parameter shift$_K$ is set from "true" to "false," so that for the next method run an engaged status is assumed again.

In contrast, if it is detected in method step 8 that minimum time period $T_{shift,min}$ has not yet been reached, the program continues along the No branch directly to block 11 and then to the start of the method.

If the query in method step 6 results in at least one of the conditions to be checked there not being met, the program continues along the No branch to method step 9 in which time counter $t_{shift}$ is set to its initial value zero. Subsequently the method continues via method block 11 and back again to method step 1. The clutch status is then not yet reset from "true" to "false," i.e., from disengaged to engaged in this method run.

What is claimed is:

1. A method for detecting a status of a clutch in a drive train of a motor vehicle as part of an engine drag torque control, comprising:
    ascertaining an engine speed of a driving motor and at least one of (a) a vehicle speed and (b) an axle speed;
    forming a transmission ratio from the engine speed and at least one of (a) the vehicle speed and (b) the axle speed;
    determining the clutch status from a comparison of the transmission ratio with a reference value;
    making the reference value equal to the transmission ratio at a first time step;
    at a subsequent time step from the first time step, forming a difference between an instantaneous transmission ratio and the reference value;
    detecting a disengaged clutch status if the difference between an instantaneous transmission ratio and the reference value exceeds a threshold value; and
    influencing the engine drag torque control as a function of the detected clutch status.

2. The method according to claim 1, wherein the method is performed during engine drag torque control.

3. The method according to claim 1, wherein the disengaged clutch status is detected if an absolute value of the difference between the instantaneous transmission ratio and the reference value exceeds the threshold value.

4. The method according to claim 1, wherein an engine drag torque control is deactivated if a disengaged clutch status is detected, and activated in an engaged clutch status.

5. The method according to claim 1, wherein an engaged clutch status is detected if the difference between the instantaneous transmission ratio and the transmission ratio from a previous time step is less than a threshold value.

6. The method according to claim 5, wherein an engaged clutch status is detected if an absolute value of the difference between the instantaneous transmission ratio and the transmission ratio from the previous time step is less than the threshold value.

7. The method according to claim 5, wherein an engaged clutch status is detected if the difference between the instantaneous transmission ratio and the transmission ratio from the previous time step is less than the threshold value for a minimum time period.

8. The method according to claim 5, wherein an engaged clutch status is detected only if an instantaneous engine speed exceeds a minimum rotational speed.

9. The method according to claim 1, wherein the reference value is made equal to the transmission ratio if an engaged clutch status is detected again following a disengaged clutch status.

10. The method according to claim 1, wherein a signal of the transmission ratio is filtered using a first-order delay element.

11. The method according to claim 1, wherein the transmission ratio is determined based on an average driving axle speed.

12. The method according to claim 1, wherein the status of the clutch is detected only at a vehicle speed which is greater than a speed threshold value.

13. The method according to claim 1, wherein the transmission ratio is formed as a function of a quotient of the engine speed and the vehicle speed, the transmission ratio being obtained from a constant multiplied by the quotient of the engine speed and the vehicle speed.

14. The method according to claim 1, wherein the transmission ratio is formed from the engine speed and the axle speed.

* * * * *

UNITED STATES PATENT AND TRADEMARK OFFICE
CERTIFICATE OF CORRECTION

PATENT NO.       : 8,401,754 B2  
APPLICATION NO. : 12/304706  
DATED            : March 19, 2013  
INVENTOR(S)      : Helmut Wandel It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 611 days.

Signed and Sealed this

First Day of September, 2015

Michelle K. Lee
*Director of the United States Patent and Trademark Office*